May 5, 1953 E. W. FAHEY 2,637,458
EGG HANDLING APPARATUS
Filed June 12, 1948 6 Sheets-Sheet 1

INVENTOR.
Edward W. Fahey
BY
Cromwell, Greist & Warden
Att'ys

May 5, 1953 E. W. FAHEY 2,637,458
EGG HANDLING APPARATUS
Filed June 12, 1948 6 Sheets-Sheet 2
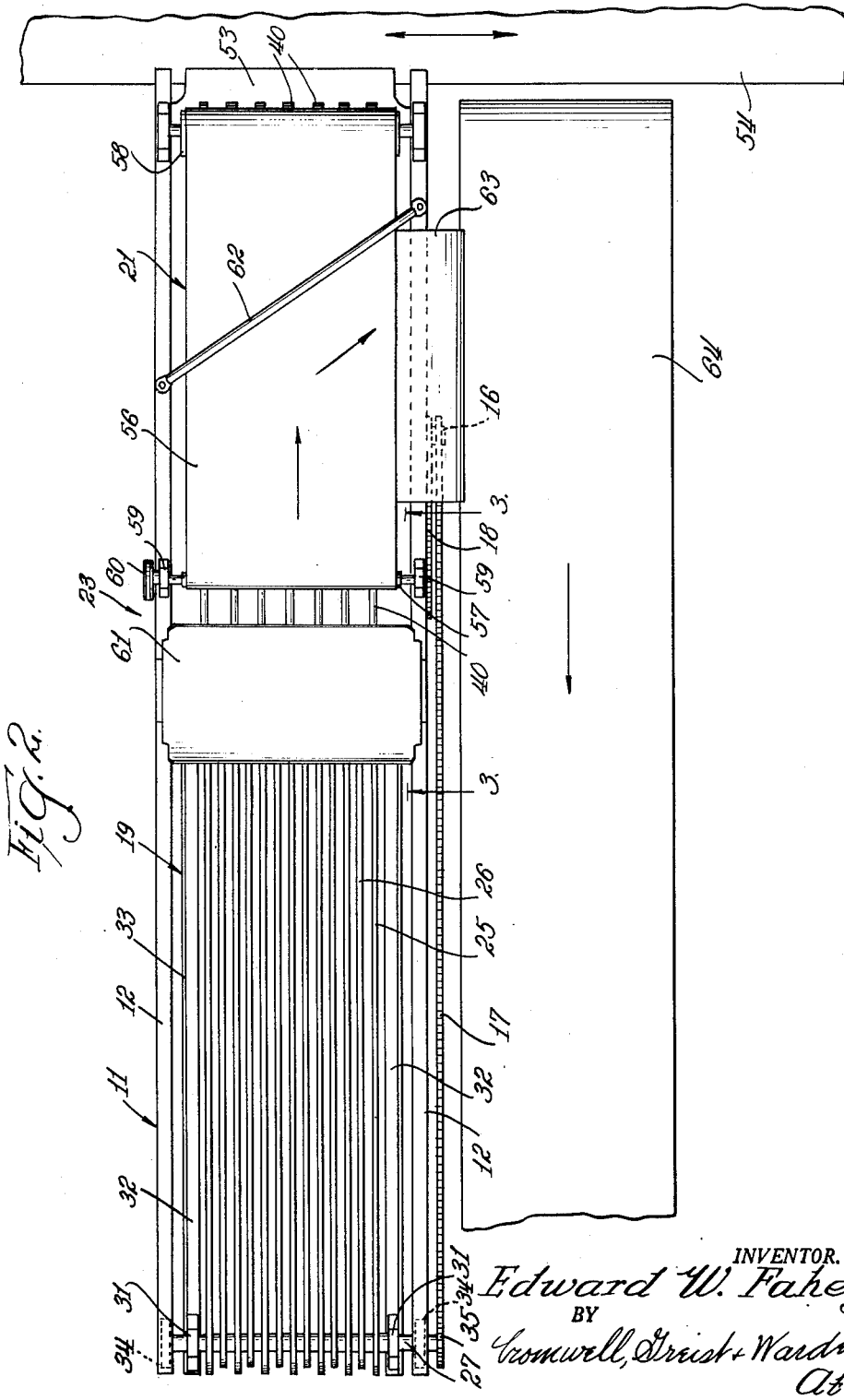
INVENTOR.
Edward W. Fahey
BY
Cromwell, Greist + Warden
Attys

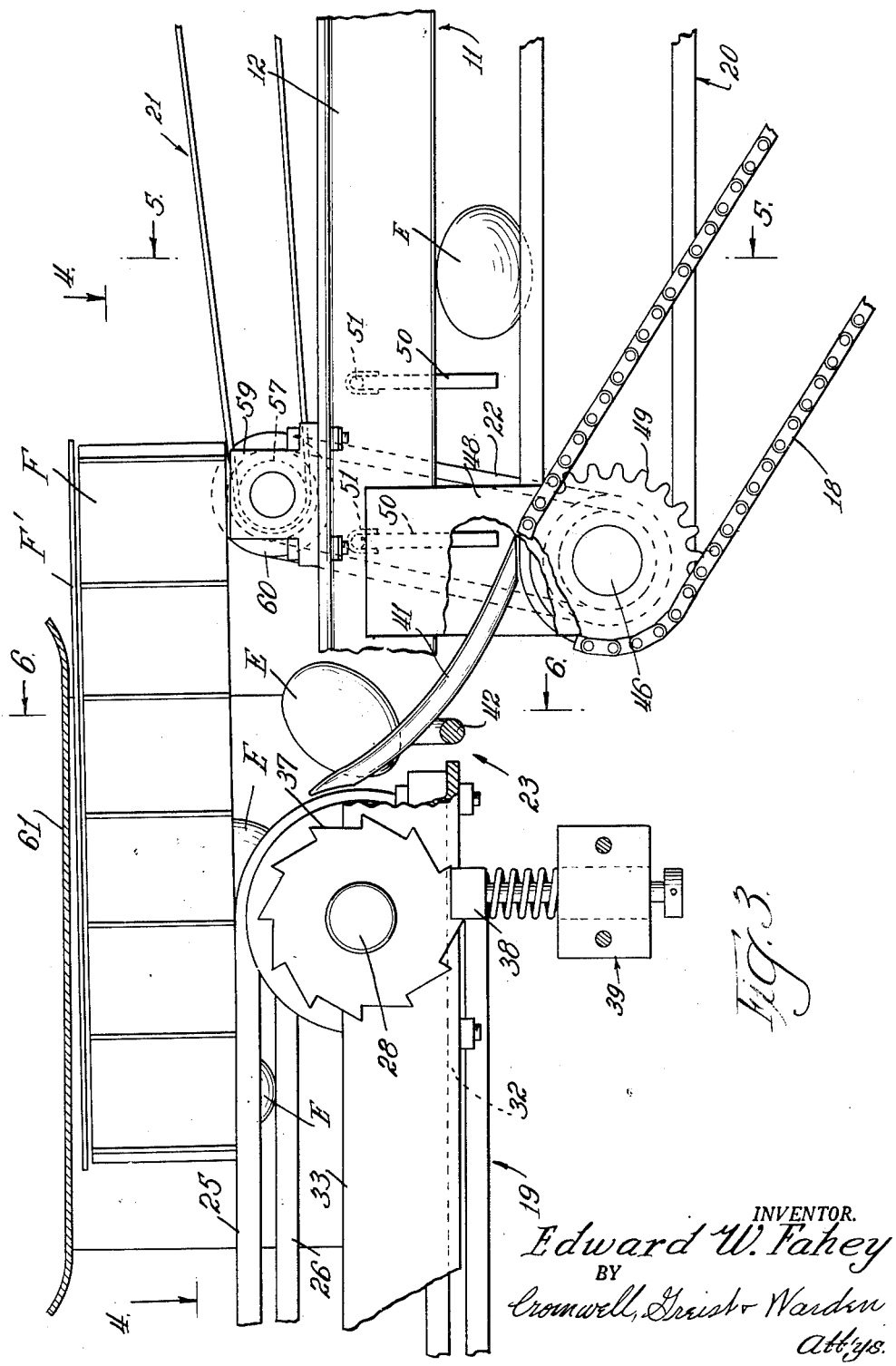

May 5, 1953     E. W. FAHEY     2,637,458
EGG HANDLING APPARATUS
Filed June 12, 1948     6 Sheets-Sheet 4
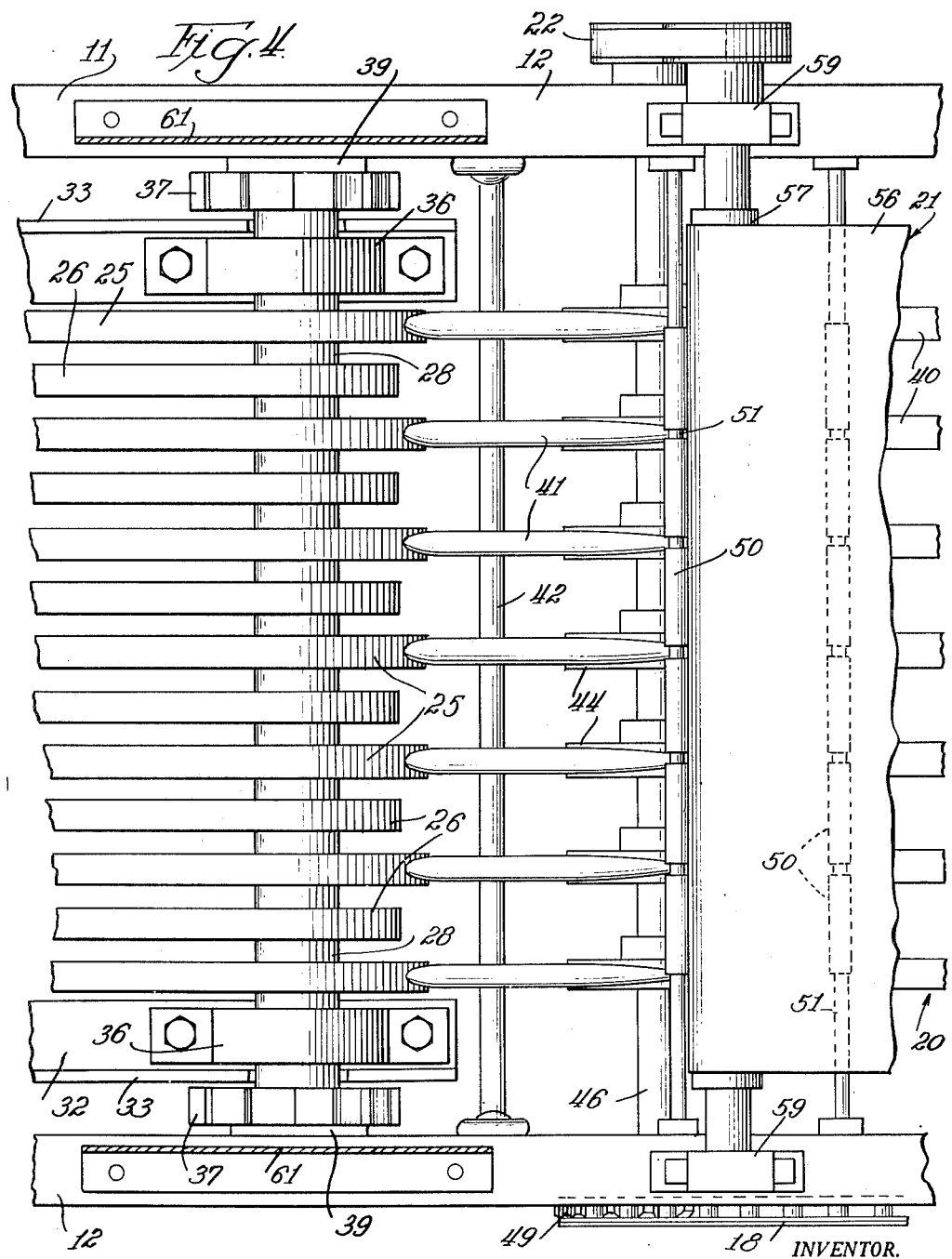
INVENTOR.
Edward W. Fahey
BY
Cromwell, Greist & Warden
Att'ys.

May 5, 1953  E. W. FAHEY  2,637,458
EGG HANDLING APPARATUS
Filed June 12, 1948  6 Sheets-Sheet 5
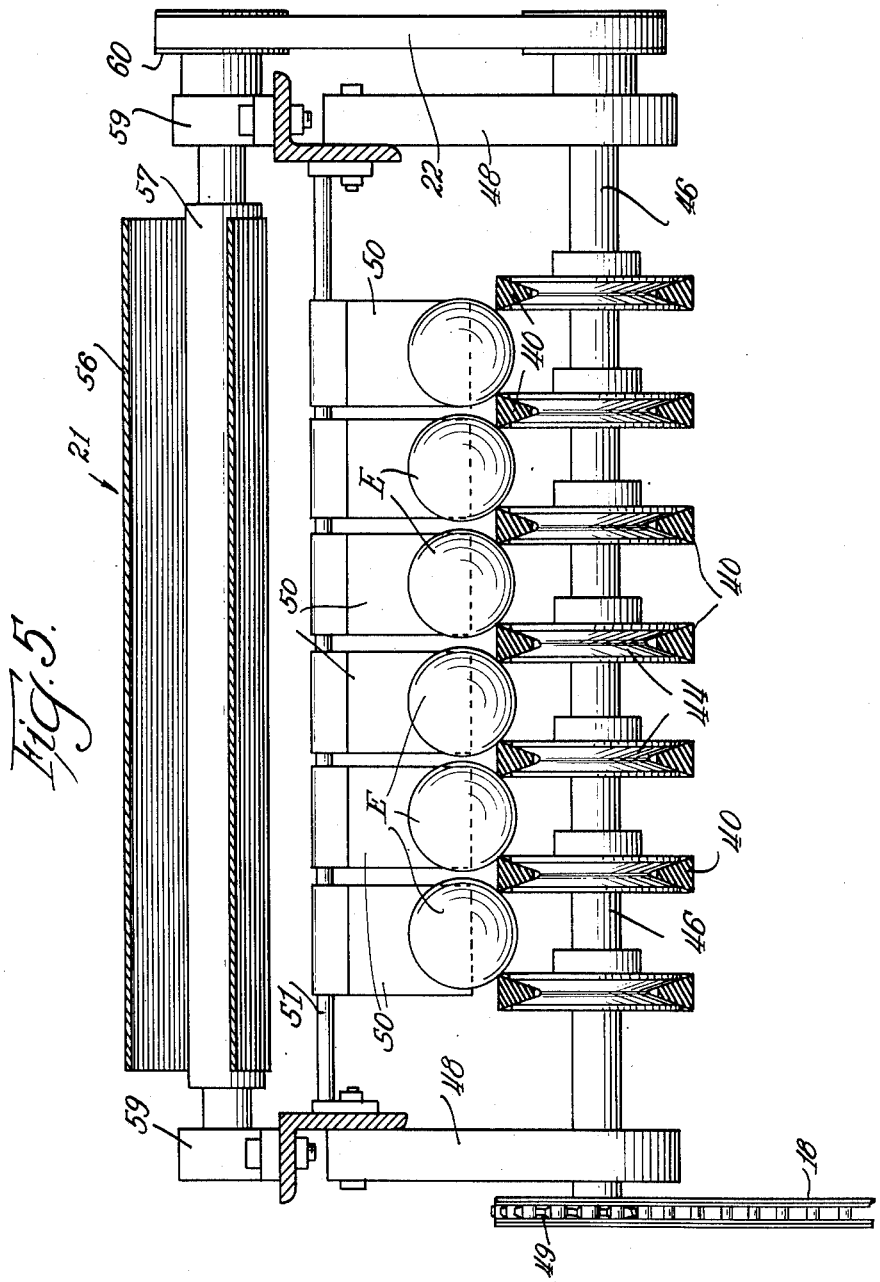
INVENTOR.
Edward W. Fahey
BY
Cromwell, Greist & Warden
Att'ys May 5, 1953  E. W. FAHEY  2,637,458
EGG HANDLING APPARATUS
Filed June 12, 1948  6 Sheets-Sheet 6
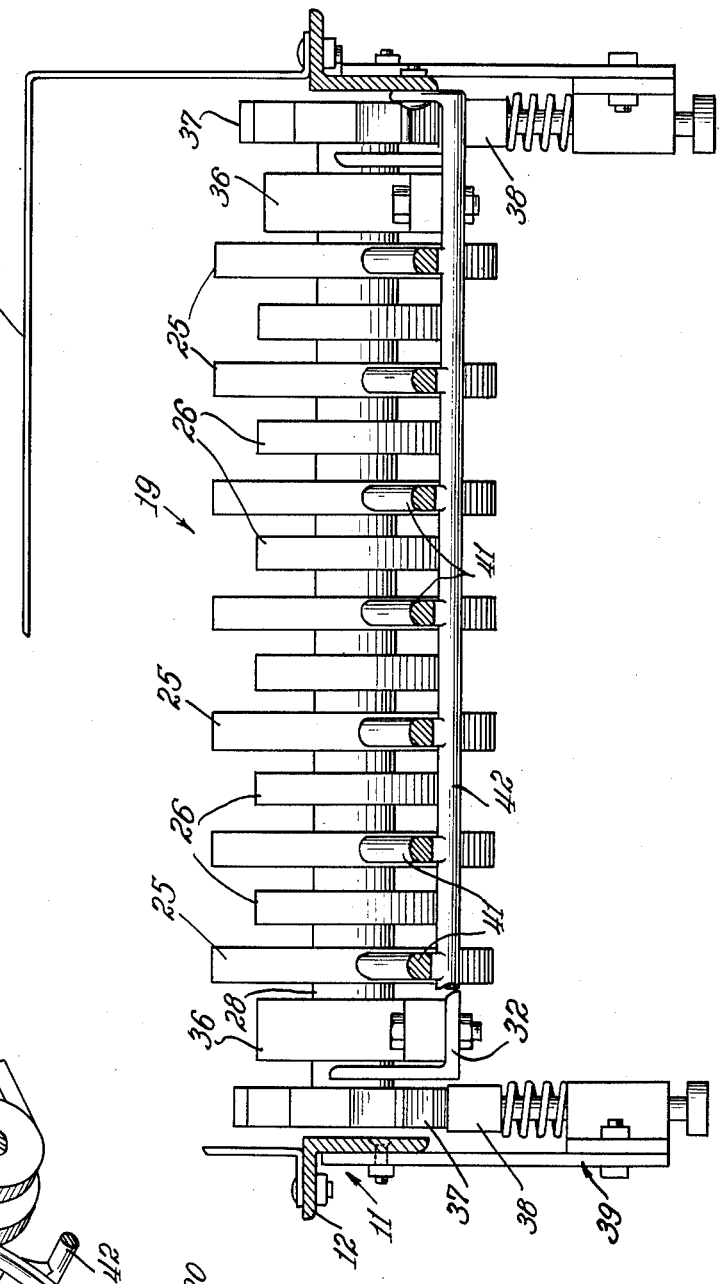
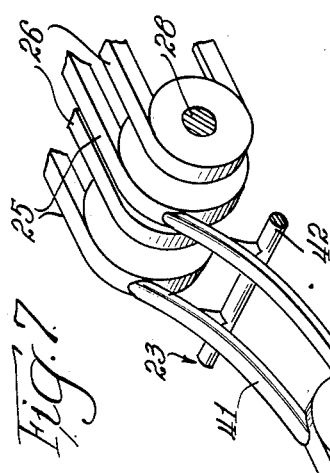
INVENTOR.
Edward W. Fahey
BY
Cromwell, Greist & Warden
Att'ys Patented May 5, 1953

2,637,458

UNITED STATES PATENT OFFICE 2,637,458

EGG HANDLING APPARATUS

Edward W. Fahey, Chicago, Ill., assignor to Shellmar Products Corporation, Chicago, Ill., a corporation of Delaware Application June 12, 1948, Serial No. 32,566

17 Claims. (Cl. 214—300)

The present invention pertains to an improved apparatus for the handling of eggs, and, more particularly, in the removal thereof, preparatory to candling or other operation, from the cellular paperboard crate or case fillers in which they are usually packed for bulk shipment.

It is a general object of the invention to provide an improved apparatus for the foregoing purpose, which is characterized by the simplicity of its parts, and by the speed and reliability of its operation in advancing an egg-containing filler longitudinally, in gravitationally stripping the eggs from the filler cells without interruption of its longitudinal travel, in forwarding the eggs in controlled order in uniformly spaced, parallel, longitudinal rows to a subsequent operating point, and in returning the empty fillers to the initial loading zone.

A more specific object is to provide a continuously operative apparatus of the foregoing type, characterized by an improved arrangement of two sets of elongated, endless belt members by which the egg-containing fillers are supported in a manner to facilitate gravitational separation of eggs from the cells of the fillers, and by which said stripped eggs are delivered in controlled, laterally spaced, series order to further handling or operating mechanism.

Another specific object is to provide egg handling apparatus of the foregoing character, including a conveyor section constituted by a plurality of individual endless belts arranged with the corresponding reaches thereof in parallel, laterally spaced relation, and in which the alternate belts have their upper reaches disposed in different respective planes to facilitate the gravitational stripping of eggs from a filler transported thereby.

Yet another object is to provide an apparatus of the type referred to in the preceding paragraph which has associated therewith a further continuous, multiple belt conveyor section receiving eggs stripped from the filler, together with endless conveyor means disposed in receiving relation to the fillers to return the same toward a loading station or the like.

Yet another specific object is to provide an egg handling apparatus including a plurality of multiple belt conveyor sections of the type referred to above which are disposed in operative alignment with one another, together with means for vibrating one thereof to facilitate and expedite separation of eggs from an egg-containing filler transported thereby.

Generally, it is an object to provide a simplified, low-cost apparatus which is very simple in the character and arrangement of its operating parts, and which is compact in size, yet which reduces to a minimum the personnel required to separate the eggs from fillers and which operates at a speed sufficient to supply the requirements of a modern, high capacity, egg room.

The foregoing statements are indicative in a general way of the nature of the invention, although other and more specific objects will be apparent to those skilled in the art upon a full understanding of the construction and operation of the device.

A single embodiment of the invention is presented herein for purpose of exemplification, but it will be appreciated that the invention is susceptible of incorporation in other modified forms coming equally within the scope of the appended claims.

In the drawings,

Fig. 2 is fragmentary top plan view of the apparatus of Fig. 1, illustrating the general arrangement of certain conveyor and control elements for handling the materials operated on by said apparatus;

Fig. 3 is an enlarged fragmentary view, partially broken away and sectioned along a line corresponding generally to line 3—3 of Fig. 2, illustrating the relationship of certain parts of the apparatus adjacent the zone at which the eggs are separated from a filler and the filler and eggs separately forwarded for disposal or treatment;

Fig. 4 is a fragmentary top plan view, as viewed approximately from line 4—4 of Fig. 3, further illustrating details of the apparatus;

Figure 1:
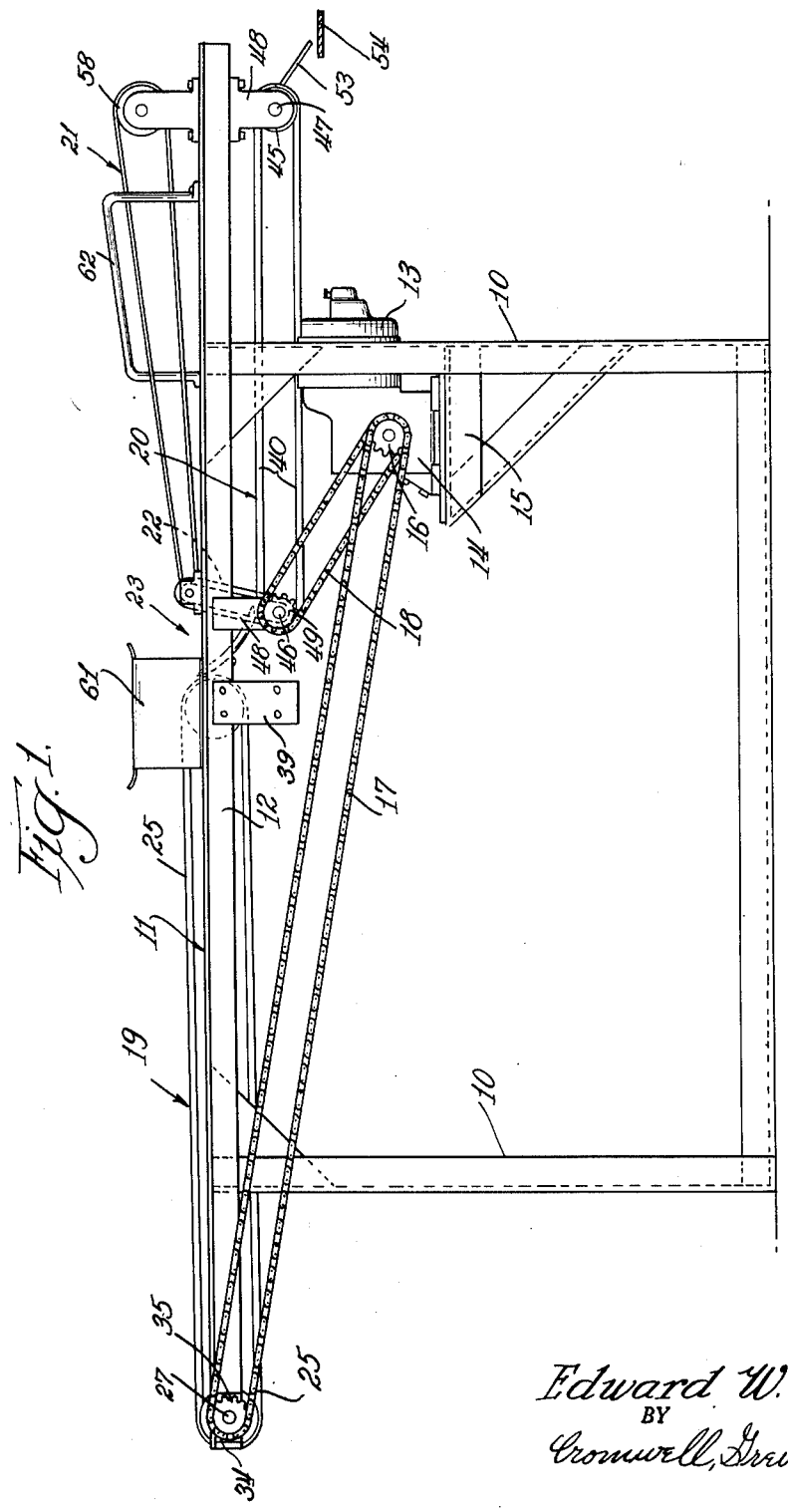
Fig. 1 is a side elevational view illustrating the general type and disposition of parts of the present apparatus, in which certain specific details of construction have been omitted in order to simplify the showing.

Figs. 5 and 6 are, respectively, views in transverse vertical section along lines generally corresponding to lines 5—5 and 6—6 of Fig. 3, still further and more clearly depicting the structural details, relationship and functioning of the apparatus; and Fig. 7 is a fragmentary perspective view illustrating a detail of a gravity transfer device incorporated in the apparatus.

The present apparatus is adequately illustrated, with regard to the general arrangement of its main operating parts in Figs. 1 and 2, to which reference is directed. It comprises a suitably reinforced, angle iron base or standard 10 on which an elongated, rectangular, angle iron frame 11 is appropriately supported. Said frame including the parallel side members 12 upon which various elements of the apparatus are mounted, said side members being suitably braced in parallel relation in a manner which need not be detailed. An operating motor 13 and connected reduction gearing 14 of conventional type are mounted on a sub-platform 15 of the standard 10, and this gearing has driving elements on its output shaft, exemplified by sprocket 16, which drive the respective endless chain belts 17, 18 or equivalent drive members.

The belt drive member 17 serves as a source of power for the primary, filler and egg feeding conveyor of the apparatus, generally designated 19, to be hereinafter described in detail; and the belt drive 18 serves as a similar source of power for the secondary, egg receiving and aligning conveyor of the apparatus, generally designated 20, while at the same time driving the tertiary, filler discharging conveyor of the apparatus, generally designated 21, through the agency of a connecting chain or belt 22.

In the operation of the machine, paperboard egg case fillers of well known collapsible cellular sort, such as are illustrated in Fig. 3 and designated by the reference character F, are deposited on the primary conveyor 19, with the standard molded paper pulp flats F' superposed thereover, as also shown in that figure. This is accomplished by the use of a conventional type of lifter which enables a complete filler to be lifted by an attendant, along with the eggs E contained therein, and set down on the conveyor. It should be particularly noted that the flat F' is supported on top of filler F, since it is a feature of the apparatus that the need to later separate the flat from the filler is eliminated, the eggs being supported directly on conveyor 19. The latter transports the egg-containing filler while vibrating the same in a fashion to tend to loosen the eggs from its cells by means to be described.

Reaching the end of said conveyor, the eggs are gravitationally discharged and roll downwardly over a fixed bridge or transfer device, generally designated 23, onto the secondary conveyor 20. They are properly and quite uniformly spaced and aligned in parallel rows by conveyor 20, and transported for further operation or disposal. In the meantime, the empty filler and flat assemblies F, F' are delivered onto the tertiary belt conveyor 21 by which they are discharged and returned to a suitable station, in a manner to be described. The above is a generalized statement of the arrangement and functional relation of the main operating parts of the apparatus. Specific details and operational relationships of the various parts referred to above will be readily understood by reference to Figs. 3 through 7, taken in conjunction with Figs. 1 and 2.

Referring to Figs. 2, 3 and 4, the primary conveyor 19 comprises two sets of elongated, endless, V-type conveyor belts, designated respectively 25 and 26. These are trained at their opposite ends over aligned pulleys on the transverse shafts 27, 28 at opposite ends of the conveyor 19, of which the shaft 27 serves as a conveyor drive shaft. The respective pulleys mounting belts 25 are of somewhat larger diameter than those mounting belts 26, with the result that the transversely alternating belts 25, 26 present upper, horizontal, article supporting reaches which are located in different respective horizontal planes, as clearly illustrated in Figs. 3 and 6. There are a plurality of belts in each set (seven of the belts 25 and six of the belts 26 being involved in the illustrated embodiment), and they are arranged in parallel, equally spaced order laterally of the machine. The purpose of this arrangement is to support and transport the fillers F on the upper reaches of parallel belts 25, while allowing the eggs to gravitate onto the upper reaches of lower belts 26, between the belts 25 on either side thereof, as the conveyor is vibrated by the means to be described.

The shaft 27 supporting the set of belt pulleys at one end of the conveyor 19, i. e., to the left in Figs. 1 and 2, is appropriately mounted in a pair of transversely aligned bearings 31, said bearings being secured respectively to a pair of parallel side members 32 which define an oscillatory vibrating frame 33 on which the conveyor 19 is mounted. Appropriate spacing provisions may be made along shafts 27, 28 to maintain the side members 32 in fixed relation to one another. Frame 33 is disposed within the side members 12 of the main apparatus frame 11, as illustrated in Fig. 2, and the pulley driving shaft 27 may additionally serve to pivot the frame 32 to the main frame along the shaft axis. Suitable bearings 34 on fixed frame side members 12 may be employed for this purpose. Shaft 27 has a drive sprocket 35 secured to one end thereof which is drivingly engaged by the belt drive member 17 to actuate the respective sets of belts 25, 26 of the conveyor 19.

The opposite, oscillatory end of the aforesaid frame 33 is provided with transversely aligned bearings 36 mounted on its respective side members 32, in the fashion illustrated in Figs. 3, 4 and 6, which bearings journal the transverse pulley shaft 28 referred to above. The other set of pulleys for the alternate belts 25, 26 is secured to and drives this shaft. The end of frame 33 adjacent the bearing 36 is floating in its action, and is adapted to be vertically vibrated to assist in freeing the eggs E from the frictional grip of the cells of filler F, as the latter is transported by conveyor 19. To this end, the shaft 28 has the vibration imparting ratchet wheels 37 secured thereto adjacent its opposite ends, externally of vibratory frame 33 but within the fixed frame side members 12. The latter support spring urged hardened wear shoes or members 38 which are appropriately mounted on brackets 39 on said frame members. said wear members underlying and supporting the respective ratchet wheels 37. Accordingly, as the conveyor belts 25, 26 are driven they rotate wheels 37 and impart an abrupt vibratory movement to frame 33, as said belts support and advance the eggs E and filler F, respectively. Assisted by the aforesaid vibration, the eggs E drop onto the upper reaches of the vertically lowermost set of conveyor belts 26, between the belts 25, and are positively transported thereby. while the reaches of the uppermost set of belts 25 sustain and forward the filler. The vibration is not of sufficient intensity to damage the eggs, being cushioned by the resilient mounting of wear members 38.

Reaching the end of conveyor 19, the eggs separate gravitationally from the filler and roll down the transfer device 23 onto the laterally spaced V-belts 40 of the secondary conveyor 20. This device comprises a plurality of downwardly curved rods 41, one of which is longitudinally aligned with each of the upper belts 25 of conveyor 19 and extends upwardly adjacent the same. These rods are fixedly supported in uniformly spaced relation on a transverse rod 42 (see Fig. 7) which is suitably secured at its ends to the main frame of the apparatus. The lower ends of the rods terminate in overlying relation to the secondary conveyor belts 40, of which there is one for each rod 41, longitudinally aligned with the latter, as illustrated in Fig. 4. Accordingly, eggs are gravitationally guided by rods 41 onto belts with a minimum of shock, but in the event of egg breakage at said rods, the spaced character thereof renders the same substantially self-cleaning, so that the apparatus is not substantially fouled.

Secondary conveyor belts 40 are trained around pulleys 44, 45 on the shafts 46, 47 respectively. Said shafts are mounted in suitable depending bearings 48 on the apparatus frame 11, as illustrated in Fig. 1, and shaft 46 has a sprocket 49 thereon which is drivingly engaged by the belt drive member 18 to positively actuate the conveyor 20.

In passing onto the belts 40 of conveyor 21, the eggs travel beneath successive sets of rubber covered flaps 50 which are freely pivoted on rods 51 extending across and secured at their ends to the apparatus frame. These flaps are arranged to overlie the respective spaces between conveyor belts 40, and their function is to properly and uniformly position the eggs as they are transported by and between the respective belts 40, as illustrated in Fig. 3.

Eggs are conveyed along the conveyor 20 to the end thereof, whereupon they roll down an inclined discharge lip 53 and may be transported to another point or station by a transversely arranged conveyor belt, such as is generally illustrated in Figs. 1 and 2 and designated by the reference numeral 54.

The flats and fillers F, F', from which the eggs are gravitationally discharged, are forwarded by conveyor 19 onto the tertiary conveyor 21 for further disposition. This last named conveyor is preferably in the form of a relatively wide belt 56, one end of which is trained around a relatively small diameter roller or pulley 57 adjacent the egg transfer device 23 and the other end around a somewhat larger roller or pulley 58 adjacent the discharge end of the machine. Pulley 57 is journaled in the brackets 59 on the frame 11 and is driven through a sprocket 60 on its shaft by belt drive member 22.

The associated, empty filler and flat assemblies pass on to belt 56 from the conveyor 19 and are separated from the succeeding filler by the more rapid travel of belt 56 as compared to said conveyor 19. The difference in speed amounts to about 3 feet per minute. Insurance against the forward end of the filler F tipping downwardly during such transfer, due to the frictional action of the eggs E dropping therefrom, is furnished by a fixed sheet metal restrainer 61 mounted on the machine frame. This member extends across the discharge end of conveyor 19 in spaced, overlying relation to the latter, so that any tendency of the empty filler and flat assembly to tip forwardly toward secondary conveyor 20 is positively prevented by this device.

Passing forwardly on the belt conveyor 21, the filler and flat assemblies are cammingly engaged by an inclined, tubular deflector 62 extending at an angle across said tertiary conveyor, and are laterally discharged by said deflector. They slide downwardly over a curved sheet metal side guide member 63 paralleling and lying flush with, or slightly below, the upper reach of belt 56, and are deposited on a suitable removal device, such as is generally illustrated in Fig. 2 in the form of a reversely traveling conveyor belt 64. The filler and flat assemblies are transported rearwardly by this conveyor means to a suitable station for re-use.

The above described apparatus is notable for its simplicity, compactness and economy of parts. It functions continuously, automatically and at sufficiently high speed to be used as an adjunct of a modern high capacity egg room, supplying the requirements of numerous candlers. In short, it eliminates what has heretofore constituted a source of considerable time loss and personnel cost in the egg inspecting and packing operation, namely, the operation of manual removal, without wasteful breakage, of eggs from fillers, in sufficient quantity and speed to satisfy such egg room requirements.

Although structural features of the invention, as embodied in the preceding specification have been described by reference to certain specific details, it is to be understood that variations in many of these details will suggest themselves readily to those skilled in the art. Hence, to the extent that they constitute equivalents of the described structure, they are contemplated as being within the scope of the invention.

I claim:

1. Egg handling apparatus comprising a conveyor adapted to transport egg-containing fillers, said conveyor comprising a plurality of parallel, flexible, laterally spaced, endless conveyor members extending longitudinally of the apparatus and means mounting said conveyor members to present sets of upper, article supporting reaches which are spaced vertically in two levels relative to one another, the reaches of said respective sets alternating in their disposal transversely of the apparatus and being adapted to support said filler and eggs, respectively, and means to drive said conveyor members longitudinally.

2. Egg handling apparatus comprising a conveyor adapted to transport egg-containing fillers, said conveyor comprising a plurality of parallel, flexible, laterally spaced, endless conveyor members extending longitudinally of the apparatus and means mounting said conveyor members to present sets of upper, article supporting reaches which are spaced vertically in two levels relative to one another, the reaches of said respective sets alternating in their disposal transversely of the apparatus and being adapted to support said filler and eggs, respectively, means to drive said conveyor members longitudinally, and means to vibrate said conveyor while driving said members.

3. Egg handling apparatus comprising a conveyor adapted to transport egg-containing fillers, said conveyor comprising a plurality of parallel, flexible, laterally spaced, endless conveyor members extending longitudinally of the apparatus and coaxial pulley means mounting said conveyor members to present sets of upper, article supporting reaches which are spaced vertically from one another in alternating order transversely of the apparatus, said respective sets of reaches being adapted to support said filler and eggs, respectively, and means to drive said conveyor members longitudinally.

4. Egg handling apparatus comprising a conveyor adapted to transport egg-containing fillers, said conveyor comprising a plurality of parallel, flexible, laterally spaced, endless conveyor members extending longitudinally of the apparatus and coaxial pulley means mounting said conveyor members to present sets of upper, article supporting reaches which are spaced vertically from one another in alternating order transversely of the apparatus, said respective sets of reaches being adapted to support said filler and eggs, respectively, means to drive said conveyor members longitudinally, and means to vibrate said conveyor while driving said members.

5. Egg handling apparatus comprising a longitudinally traveling conveyor adapted to transport egg-containing fillers said conveyor comprising a plurality of elongated, parallel, laterally spaced, endless, flexible conveyor members, certain of said conveyor members being disposed to present reaches which are in horizontal coplanar relation, other of said members alternating laterally with said certain members and being disposed to present reaches which are coplanar with one another and are spaced vertically from said first named reaches, said respective sets of reaches being adapted to support said fillers and eggs, respectively, and means to support said conveyor members in the aforesaid relation.

6. Egg handling apparatus comprising a conveyor adapted to transport egg-containing fillers in a longitudinal direction, said conveyor comprising a plurality of elongated, parallel, endless, flexible conveyor members presenting alternating upper reaches at different vertical levels, the respective sets of alternate reaches being at corresponding levels, a frame, sets of pulleys on said frame supporting opposite ends of said conveyor members in the aforesaid relation and means to vibrate said conveyor, comprising a pivotal support for one end of said frame and positively driven means acting to vertically oscillate the opposite end of said frame about its pivotal axis.

7. Egg handling apparatus comprising a conveyor adapted to transport egg-containing fillers in a longitudinal direction, means to drive the conveyor, said conveyor comprising two sets of elongated, parallel, laterally alternating, endless, flexible conveyor members, a plurality of members to each set, disposed with sets of corresponding alternate upper reaches in two different horizontal planes, said reaches of the respective sets being in like planes, a frame, means on said frame supporting opposite ends of said conveyor members in the aforesaid relation and means to vibrate said conveyor, comprising a pivotal support for one end of said frame and positively driven means acting to vertically oscillate the opposite end of said frame about its pivotal axis.

8. Egg handling equipment comprising a supply conveyor for egg-containing fillers and an egg receiving conveyor supplied thereby, said conveyors each comprising a plurality of parallel elongated, endless, belt-like members and means mounting the respective members of each conveyor in parallel, laterally spaced relation to one another, said supply conveyor including two sets of said members presenting upper reaches at different vertical levels, an end of said receiving conveyor being located in a longitudinally aligned, receiving relation of its laterally spaced members to the members of said supply conveyor which present the higher upper reaches.

9. Egg handling equipment comprising a supply conveyor for egg-containing fillers and an egg receiving conveyor supplied thereby, said conveyors each comprising a plurality of parallel elongated, endless, belt-like members and means mounting the respective members of each conveyor in parallel, laterally spaced relation to one another, said supply conveyor including two sets of said members presenting upper reaches at different vertical levels, an end of said receiving conveyor being located in a longitudinally aligned, receiving relation of its laterally spaced members to the members of said supply conveyor which present the higher upper reaches, and means for guiding eggs discharged from said supply conveyor to position between the members of said receiving conveyor.

10. Egg handling equipment comprising a supply conveyor for egg-containing fillers and an egg receiving conveyor supplied thereby, said conveyors each comprising a plurality of parallel elongated, endless, belt-like members and means mounting the respective members of each conveyor in parallel, laterally spaced relation to one another, said supply conveyor including two sets of said members presenting upper reaches at different vertical levels, an end of said receiving conveyor being located in a longitudinally aligned, receiving relation of its laterally spaced members to the members of said supply conveyor which present the higher upper reaches, and means including spaced rods in alignment with said aligned conveyor members for guiding eggs discharged from said supply conveyor to position between the members of said receiving conveyor.

11. Egg handling equipment comprising a longitudinally traveling supply conveyor for egg-containing fillers and a longitudinally traveling receiving conveyor supplied thereby, an end of said receiving conveyor being located adjacent the discharge end of said supply conveyor and in a vertically depressed, longitudinally aligned, receiving relation to said supply conveyor, inclined guide means between said supply and receiving conveyors to gravitationally deposit on the latter eggs freed from fillers on the former and a further conveyor disposed above said receiving conveyor with its receiving end in longitudinally aligned, substantially coplanar relation to said supply conveyor to dispose of fillers discharged from the latter, said supply conveyor comprising two sets of parallel belt-like members having upper reaches of the members of each set in one of two different horizontal planes, said guide means comprising inclined guide rods longitudinally aligned with the upper set of said reaches.

12. Egg handling equipment comprising a longitudinally traveling supply conveyor for egg-containing fillers and a longitudinally traveling receiving conveyor supplied thereby, said conveyors each comprising a plurality of elongated, endless belt-like members and means mounting said members in parallel, laterally spaced relation to one another to receive therebetween eggs dropping from the cells of the fillers, an end of said receiving conveyor being located adjacent the discharge end of said supply conveyor and in a vertically depressed, longitudinally aligned, receiving relation to said supply conveyor, inclined guide means between said supply and receiving conveyors to gravitationally deposit on the latter eggs freed from fillers on the former and a further conveyor disposed above said receiving conveyor with its receiving end in longitudinally aligned, substantially coplanar relation to said supply conveyor to dispose of fillers discharged from the latter, said supply conveyor comprising two sets of parallel belt-like members having upper reaches of the members of each set in one of two different horizontal planes, said guide means comprising inclined guide rods longitudinally aligned with the upper set of said reaches and with the members of said receiving conveyor.

13. Egg handling equipment comprising a supply conveyor for egg-containing fillers and a receiving conveyor supplied thereby, said supply conveyor comprising a plurality of elongated, laterally spaced, endless belt-like members disposed with the upper reaches of alternate members at different elevations, said receiving conveyor comprising a plurality of elongated, laterally spaced, endless belt-like members and means mounting said last named members in a vertically depressed, longitudinally aligned, receiving relation of corresponding ends thereof to alternate members of said supply conveyor, and means for guiding eggs gravitationally discharged from said supply conveyor to position between the members of said receiving conveyor.

14. Egg handling equipment comprising a supply conveyor for egg-containing fillers and a receiving conveyor supplied thereby, said supply conveyor comprising a plurality of elongated, laterally spaced, endless belt-like members disposed with the upper reaches of alternate members at different elevations, said receiving conveyor comprising a plurality of elongated, laterally spaced, endless belt-like members and means mounting said last named members in a vertically depressed, longitudinally aligned, receiving relation of corresponding ends thereof to alternate members of said supply conveyor, means for guiding eggs gravitationally discharged from said supply conveyor to position between the members of said receiving conveyor, and a further conveyor in receiving relation to said supply conveyor and to dispose of empty fillers discharged from the latter.

15. Egg handling equipment comprising a supply conveyor for egg-containing fillers and a receiving conveyor supplied thereby, said supply conveyor comprising a plurality of elongated, endless belt-like members and means mounting said members in parallel, laterally spaced relation to one another, the members of said supply conveyor being arranged to present alternate upper reaches of said members at different levels, an end of said receiving conveyor being located adjacent the discharge end of said supply conveyor and in a vertically depressed, longitudinally aligned, receiving relation to said supply conveyor, and a further conveyor disposed above said receiving conveyor in receiving relation to said supply conveyor to dispose of fillers discharged from the latter.

16. Egg handling equipment comprising a supply conveyor for egg-containing fillers and a receiving conveyor supplied thereby, said conveyors each comprising a plurality of elongated, endless belt-like members and means mounting said members in parallel, laterally spaced relation to one another, the members of said supply conveyor being arranged to present alternate upper reaches of said members at different levels, an end of said receiving conveyor being located adjacent the discharge end of said supply conveyor and in a vertically depressed, longitudinally aligned, receiving relation to said supply conveyor, and a further conveyor disposed above said receiving conveyor in receiving relation to said supply conveyor to dispose of fillers discharged from the latter.

17. Egg handling equipment comprising a supply conveyor for egg-containing fillers and a receiving conveyor supplied thereby, said conveyors each comprising a plurality of elongated, endless belt-like members and means mounting said members in parallel, laterally spaced relation to one another, the members of said supply conveyor being arranged to present alternate upper reaches of said members at different levels, an end of said receiving conveyor being located adjacent the discharge end of said supply conveyor and in a vertically depressed, longitudinally aligned, receiving relation to said supply conveyor, elements disposed between the members of said receiving conveyor to frictionally engage and align eggs gravitationally deposited on the same from said supply conveyor, and a further conveyor disposed above said receiving conveyor in receiving relation to said supply conveyor to dispose of fillers discharged from the latter.

EDWARD W. FAHEY.

References Cited in the file of this patent

UNITED STATES PATENTS

| Number | Name | Date |
|---|---|---|
| 636,762 | Conley | Nov. 14, 1899 |
| 807,916 | Edmund | Dec. 19, 1905 |
| 1,050,400 | Steele | Jan. 14, 1913 |
| 1,743,062 | Hiller et al. | Jan. 7, 1930 |
| 1,955,983 | Stebler | Apr. 24, 1934 |
| 1,960,339 | Howard | May 29, 1934 |
| 2,074,383 | Funk | Mar. 23, 1937 |
| 2,090,258 | Hunter | Aug. 17, 1937 |
| 2,093,338 | Niederer | Sept. 14, 1937 |
| 2,112,259 | Wyland | Mar. 29, 1938 |
| 2,119,596 | Mintert | June 7, 1938 |
| 2,260,587 | Shields | Oct. 28, 1941 |
| 2,268,724 | Shackelford | Jan. 6, 1942 |